W. C. ANDERSON.
FRUIT GRADER.
APPLICATION FILED MAR. 9, 1908.
916,647.
Patented Mar. 30, 1909.
2 SHEETS—SHEET 1.
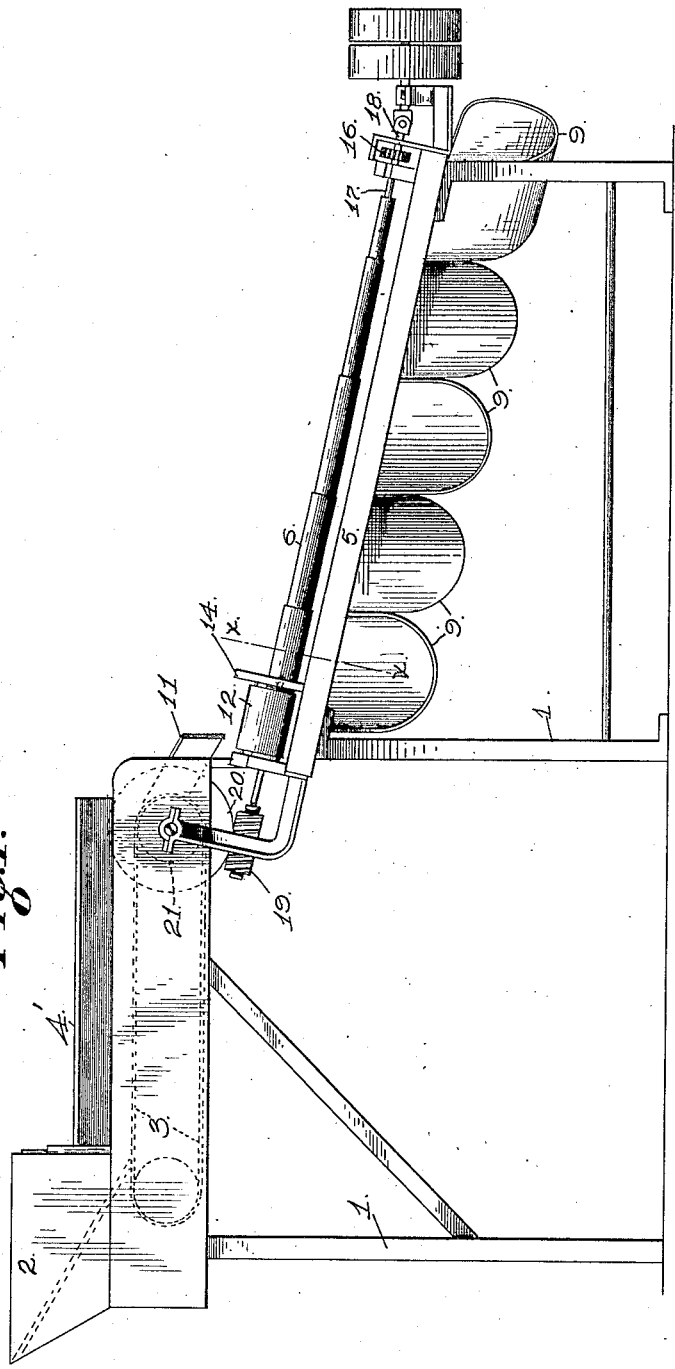
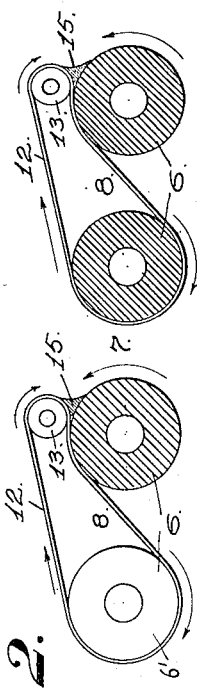
WITNESSES.
INVENTOR.
William C. Anderson
by Wm F. Booth
his Attorney

W. C. ANDERSON.
FRUIT GRADER.
APPLICATION FILED MAR. 9, 1908.

916,647.

Patented Mar. 30, 1909.
2 SHEETS—SHEET 2.

WITNESSES.

INVENTOR.
William C. Anderson
by Wm F. Booth
his Attorney

UNITED STATES PATENT OFFICE.

WILLIAM C. ANDERSON, OF SAN JOSE, CALIFORNIA, ASSIGNOR TO ANDERSON-BARNGROVER MFG. CO., OF SAN JOSE, CALIFORNIA, A CORPORATION OF CALIFORNIA.

FRUIT-GRADER.

No. 916,647.   Specification of Letters Patent.   Patented March 30, 1909.

Application filed March 9, 1908. Serial No. 419,892.

*To all whom it may concern:*

Be it known that I, WILLIAM C. ANDERSON, a citizen of the United States, residing at San Jose, in the county of Santa Clara and State of California, have invented certain new and useful Improvements in Fruit-Graders, of which the following is a specification.

My invention relates to that class of graders for fruit and the like, in which rotatable rolls having grading spaces between them, are employed.

The objects of my invention are to provide a grading-table of this type, adapted to separate the material effectively and without injury, and to provide an effective feed for the material to said table.

Figure 3:
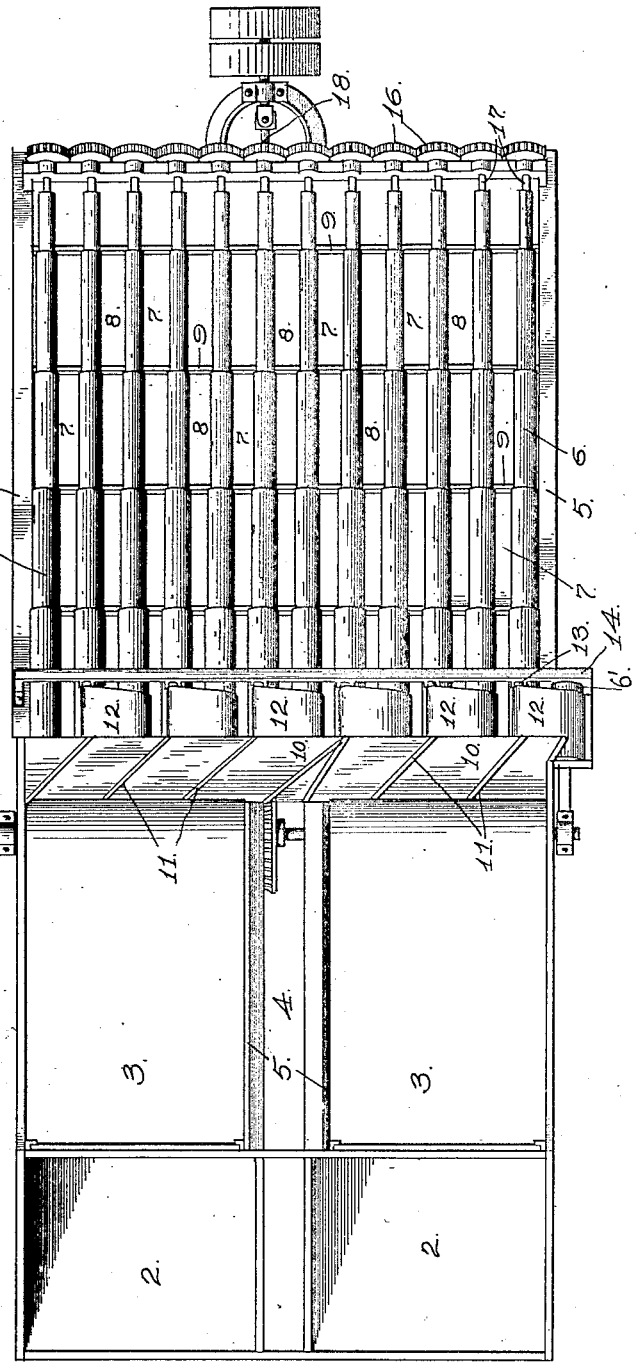
Figure 4:
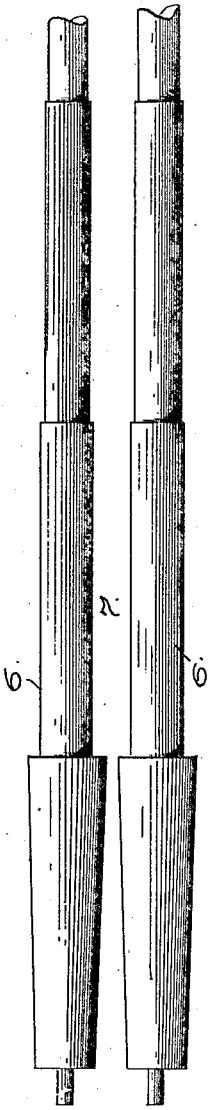

To these ends my invention consists in the novel construction of the grading-table, in the novel means for feeding the material thereto, and in the arrangement and combination of parts which I shall now fully describe, by reference to the accompanying drawings in which, Figure 1 is a side elevation of my fruit-grader. Fig. 2 is a section of two pairs of grading-rolls, on the line $x$—$x$ of Fig. 1. Fig. 3 is a plan of the fruit-grader. Fig. 4 is a detail view showing a modified pair of grading-rolls.

1 is a stand which carries, at its head, a suitable feeding device, here shown as comprising a hopper 2 and a traveling belt 3. There may be only one hopper and one belt, or there may be several of them. For illustration, I have shown two hoppers and two belts, the latter being separated by an open space 4 with side guards 4'. Into this space the operators, on each side, throw the culls and imperfect or defective fruit picked by them from the fruit body on the belts; and said excluded specimens may fall into suitable underlying receptacles, for future disposition.

On the stand 1 is the inclined grading-table, which consists of a frame 5 and the grading-rolls 6 mounted in the frame. These rolls lie lengthwise of the stand, at a downward inclination and parallel with each other. Each roll has a smooth surface throughout, and each is divided into sections of successively decreasing diameters, the largest diameter being at the head and the smallest at the foot. The rolls are arranged to leave grading-spaces 7 only between successive pairs, that is to say, a grading-space is left between the first and second rolls, a second grading-space is left between the third and fourth rolls, a third space between the fifth and sixth rolls, and so on. The spaces or intervals between adjacent rolls of adjacent pairs, indicated by 8, are non-grading intervals. The members of each pair, that is, the rolls which bound the grading-space, rotate, in their upper semi-circumference, away from each other, as shown by the arrows in Fig. 2. Under the grading-table, beneath each grading section, are suitable receptacles 9, to catch the graded fruit. At the foot of the feeding device is the delivery board 10, with guide flanges 11 to direct the fruit from the belts 3 to the head of the grading-table.

The non-grading intervals 8 between the rolls must be suitably covered at their head ends, so that the fruit shall be excluded from them. In this connection, to serve not only this purpose of covering the non-grading intervals, but also to make a more effective delivery to the grading-spaces 7, I have a series of short delivery belts 12, which travel crosswise or transversely of the rolls. Each belt 12 is mounted on the head end of one of the rolls which bounds a grading-space, and thence its upper course extends over and covers the non-grading interval between said roll and the adjacent roll which forms the wall of the next grading-space, and is mounted on a short spindle 13 which lies above said roll, said spindle being mounted in a super-frame 14 rising from the table-frame 5. From this spindle 13 the delivery belt 12 passes on its lower course over the top of the roll just below and back again to the first roll.

In order to preserve the continuity of the rolls and grading-spaces, the first delivery belt 12, as shown in Fig. 3, is mounted on and is driven by a short supplementary roll 6'. The position of the spindle 13 is such that the fruit, fed from the board 10 to the belt 12, which travels by the rotation of the grading-rolls, will be delivered sidewise to the head of the grading space. The delivery belts so arranged, make an efficient feed for all kinds of fruit. For the smaller fruits, such as olives, cherries and grapes, which are more or less round, they obviate the effect of momentum which would result from a direct linear feed to the grading-spaces, the tendency of momentum being to cause the fruit to ride over and pass its appropriate grading opening; whereas, by the side delivery of the belts 12, the discharge into the head of the grading space is without impetus, and the smaller sizes have a chance to pass through. For the larger fruit, such as pears, apricots and peaches, especially when halved, as they usually are preparatory to canning, the delivery belts 12 are peculiarly effective, in that they cause the fruit to turn on end as it drops from the belt to the grading space. Halved peaches, coming from the hoppers will lie flat on the feeding device, whether this be a shaking table or a traveling carrier. If delivered directly to the grading-space, the halves would still tend to lie flat, and in this position would ride along the whole grading-table and pass over the end. As, however, the peaches when thus halved are graded by their lesser thickness, it is essential to turn them on end. This, the delivery belts 12 do, for as the halves turn over the end of the belt, they up-end and are so delivered to the grading-space. To prevent the fruit from following around the head of the belt 12 and being caught in the roll below, there is a fixed shield 15, preferably of hard rubber, lying back of the spindle 13 and the roll, as shown in Fig. 2. This insures the release of the sticky fruit from the belt.

The rolls 6 of the grading-table are driven by gears 16 on their spindles 17, from a shaft 18 suitably connected with one of said spindles, say, the middle one. The other or head end of this spindle is extended and carries a worm 19 which meshes with a worm gear 20 on the roller 21 upon which the main feed belts 3 are mounted, whereby said belts are driven.

With the smaller and rounder fruits, such as olives, cherries and grapes, it will be of advantage to modify the head end of the grading spaces as I show in Fig. 4. Here, the first section of the rolls 6 is made conical, instead of cylindrical, the smaller end being at the head and the larger end at the foot of said section. The object sought by this is to string out the fruit in single file. The fruit being small tends to bunch and the individuals ride up on each other. This, in part, is avoided by the inclination of the table, but not wholly. With this conical construction, however, the head section of the roll has an increasing peripheral speed toward its lower end, which serves to string the fruit out in single file, one layer thick, so that it will not climb out and ride over the rolls; and once strung out, it will remain so throughout its travel over the table. The grading-rolls 6, having smooth surfaces, permit the fruit to move down the incline, without the aid of any helically directed, or other devices, attached to them, and without injury.

Having thus described my invention, what I claim as new and desire to secure by Letters Patent is:—

1. In a fruit-grader, a grading-table composed of parallel, smooth-surfaced, inclined, rotatable rolls, each formed with sections of successively decreasing diameters from their upper to their lower ends, forming between said rolls a series of graduated grading-spaces, the head sections only of said rolls being conical with the smaller diameter at the top and the larger diameter at the foot of said head sections.

2. In a fruit-grader, a grading-table composed of parallel, rotatable rolls with an intervening grading-space varying in width from head to foot, in combination with means for delivering the fruit to the head ends of said spaces in a direction crosswise thereof.

3. In a fruit-grader, a grading-table composed of a series of parallel, rotatable rolls with graduated grading-spaces between each pair of rolls and non-grading intervals between the adjacent rolls of adjacent pairs, in combination with means for delivering the fruit to the head ends of said grading-spaces in a direction crosswise thereof, and means for excluding the fruit from the head ends of the non-grading intervals.

4. In a fruit-grader, a grading-table composed of parallel, rotatable rolls with an intervening grading-space varying in width from head to foot, in combination with a traveling delivery belt at the head of and moving transversely to the length of said grading space, and adapted to deliver the fruit to the head end of the grading-space, from the side thereof.

5. In a fruit-grader, a grading-table composed of a series of parallel, rotatable rolls with graduated grading-spaces between each pair of rolls and non-grading intervals between adjacent rolls of adjacent pairs, in combination with traveling delivery belts traversing and covering the head ends of the non-grading intervals, and arranged to deliver the fruit to the head ends of the grading-spaces, from the side thereof.

6. In a fruit-grader, a grading-table composed of a series of parallel, rotatable rolls with graduated grading-spaces between each pair of rolls and non-grading intervals between adjacent rolls of adjacent pairs, in combination with traveling delivery belts traversing and covering the head ends of the non-grading intervals, and arranged to deliver the fruit to the head ends of the grading-spaces, from the side thereof, and a feeder for supplying the fruit to said delivery belts.

7. In a fruit-grader, a grading table composed of a series of parallel, rotatable rolls with graduated grading-spaces between each pair of rolls and non-grading intervals between adjacent rolls of adjacent pairs, in combination with delivery belts mounted at the heads of said rolls and driven thereby, said belts being disposed to traverse and cover the head ends of the non-grading intervals and to deliver the fruit to the head ends of the grading spaces, from the side thereof.

In testimony whereof I have signed my name to this specification in the presence of two subscribing witnesses.

WILLIAM C. ANDERSON.

Witnesses:
 WM. F. BOOTH,
 D. B. RICHARDS.